(12) United States Patent
Okita et al.

(10) Patent No.: US 11,168,378 B2
(45) Date of Patent: Nov. 9, 2021

(54) HOT-PRESSED MEMBER AND MANUFACTURING METHOD THEREFOR

(71) Applicant: JFE STEEL CORPORATION, Tokyo (JP)

(72) Inventors: Yasuaki Okita, Tokyo (JP); Rinsei Ikeda, Tokyo (JP); Seiji Nakajima, Tokyo (JP); Koichi Nakagawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 752 days.

(21) Appl. No.: 15/551,375

(22) PCT Filed: Mar. 3, 2016

(86) PCT No.: PCT/JP2016/001175
§ 371 (c)(1),
(2) Date: Aug. 16, 2017

(87) PCT Pub. No.: WO2016/139953
PCT Pub. Date: Sep. 9, 2016

(65) Prior Publication Data
US 2018/0030568 A1 Feb. 1, 2018

(30) Foreign Application Priority Data
Mar. 5, 2015 (JP) .............................. JP2015-044027

(51) Int. Cl.
*C21D 9/50* (2006.01)
*B23K 9/167* (2006.01)
(Continued)

(52) U.S. Cl.
CPC ............... *C21D 9/50* (2013.01); *B21D 22/20* (2013.01); *B21D 22/208* (2013.01); *B23K 9/16* (2013.01);
(Continued)

(58) Field of Classification Search
CPC ... C21D 9/50; C21D 9/00; C21D 1/18; B23K 31/00; B23K 9/23; B23K 9/16;
(Continued)

(56) References Cited

U.S. PATENT DOCUMENTS

| | | | |
|---|---|---|---|
| 9,616,527 B2 | 4/2017 | Francis et al. | |
| 2005/0000951 A1* | 1/2005 | Nakai | B23K 26/123 219/121.64 |

(Continued)

FOREIGN PATENT DOCUMENTS

| | | | |
|---|---|---|---|
| CN | 1608787 A | 4/2005 | |
| CN | 101104225 A | 1/2008 | |

(Continued)

OTHER PUBLICATIONS

Oikawa et al., JP2006-021216A. (machine translation) (Year: 2006).*
(Continued)

*Primary Examiner* — John A Hevey
(74) *Attorney, Agent, or Firm* — Kenja IP Law PC

(57) ABSTRACT

A hot-pressed member is formed using a tailored blank material obtained by butt joining respective ends of two or more coated steel sheets. The hot-pressed member has two or more sites formed by the respective coated steel sheets and at least one joining portion between the sites. Depending on a type of a coated layer of each of the coated steel sheets, $t_w/t_0$ is appropriately controlled where $t_w$ is a thickness of a thinnest portion in the joining portion and $t_0$ is a thickness of a thinnest site of the sites. A tensile strength of each of the sites is 1180 MPa or more.

2 Claims, 1 Drawing Sheet

(51) Int. Cl.

| | | |
|---|---|---|
| *C23C 2/06* | (2006.01) | |
| *C23C 2/40* | (2006.01) | |
| *C22C 38/60* | (2006.01) | |
| *B23K 26/21* | (2014.01) | |
| *B23K 26/348* | (2014.01) | |
| *B23K 31/00* | (2006.01) | |
| *C21D 9/00* | (2006.01) | |
| *B23K 9/23* | (2006.01) | |
| *C22C 18/00* | (2006.01) | |
| *C21D 1/18* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/28* | (2006.01) | |
| *B21D 22/20* | (2006.01) | |
| *B23K 9/16* | (2006.01) | |
| *B23K 10/02* | (2006.01) | |
| *C22C 18/04* | (2006.01) | |
| *B23K 103/08* | (2006.01) | |
| *B21D 53/88* | (2006.01) | |

(52) U.S. Cl.
CPC ............... *B23K 9/167* (2013.01); *B23K 9/23* (2013.01); *B23K 10/02* (2013.01); *B23K 26/21* (2015.10); *B23K 26/348* (2015.10); *B23K 31/00* (2013.01); *C21D 1/18* (2013.01); *C21D 9/00* (2013.01); *C22C 18/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/28* (2013.01); *C22C 38/60* (2013.01); *C23C 2/06* (2013.01); *C23C 2/40* (2013.01); *B21D 53/88* (2013.01); *B23K 2103/08* (2018.08); *C22C 18/04* (2013.01); *C22C 38/00* (2013.01)

(58) Field of Classification Search
CPC ........ B23K 9/167; B23K 10/02; B23K 26/21; B23K 26/348; B23K 2103/08; C22C 18/00; C22C 38/001; C22C 38/002; C22C 38/02; C22C 38/04; C22C 38/06; C22C 38/28; C22C 38/60; C22C 38/00; C22C 18/04; C23C 2/06; C23C 2/40; B21D 22/208; B21D 22/20; B21D 53/88
See application file for complete search history.

(56) References Cited

U.S. PATENT DOCUMENTS

| | | |
|---|---|---|
| 2009/0220815 A1 | 9/2009 | Canourgues et al. |
| 2014/0120365 A1* | 5/2014 | Miyoshi ................ C25D 5/50 428/623 |

FOREIGN PATENT DOCUMENTS

| | | | |
|---|---|---|---|
| EP | 2684985 | A1 | 1/2014 |
| GB | 1490535 | A | 11/1977 |
| JP | H11277266 | A | 10/1999 |
| JP | 2003082436 | A | 3/2003 |
| JP | 2004058082 | A | 2/2004 |
| JP | 2005021968 | A | 1/2005 |
| JP | 2006021216 | A * | 1/2006 |
| JP | 2006021216 | A | 1/2006 |
| JP | 2009534529 | A | 9/2009 |
| JP | 4867319 | B2 | 2/2012 |
| JP | 2012101270 | A | 5/2012 |
| JP | 2012197505 | A | 10/2012 |
| JP | 2013204090 | A | 10/2013 |
| WO | WO-2012169389 | A1 * | 12/2012 ............. C22C 18/00 |

OTHER PUBLICATIONS

Oikawa, JP-2006021216-A. machine translation (Year: 2006).*
Jul. 20, 2018, Office Action issued by the State Intellectual Property Office in the corresponding Chinese Patent Application No. 201680013861.0 with English language Search Report.
Jun. 26, 2018, Extended European Search Report issued by the European Patent Office in the corresponding European Patent Application No. 16758649.4.
Oct. 22, 2018, Office Action issued by the Korean Intellectual Property Office in the corresponding Korean Patent Application No. 10-2017-7026504 with English language concise statement of relevance.
Mar. 27, 2019, Office Action issued by the State Intellectual Property Office in the corresponding Chinese Patent Application No. 201680013861.0 with English language concise statement of relevance.
Apr. 26, 2016, International Search Report issued in the International Patent Application No. PCT/JP2016/001175.
Mar. 14, 2017, Notification of Reasons for Refusal issued by the Japan Patent Office in the corresponding Japanese Patent Application No. 2016-531728, with English language Concise Statement of Relevance.
Sep. 29, 2019, Office Action issued by the China National Intellectual Property Administration in the corresponding Chinese Patent Application No. 201680013861.0 with English language concise statement of relevance.
Xinlai He et al., High Performance Low Carbon Bainitic Steel—Composition, Process, Microstructure, Performance and Application, Jan. 2008, pp. 243 to 246, Metallurgical Industry Press.
Aug. 4, 2021, Office Action issued by the China National Intellectual Property Administration in the corresponding Chinese Patent Application No. 201680013861.0 with English language concise statement of relevance.
Yonglin Kang, Quality Control and Formability of Modern Automobile Sheets, Aug. 1999, pp. 97-101 with a partial English translation.
Machinery Industry Press, Technical training materials for agricultural machinery workers, Metal Materials and Heat Treatment, (Elementary, Intermediate), Aug. 1987, pp. 65-68 with a partial English translation.

* cited by examiner

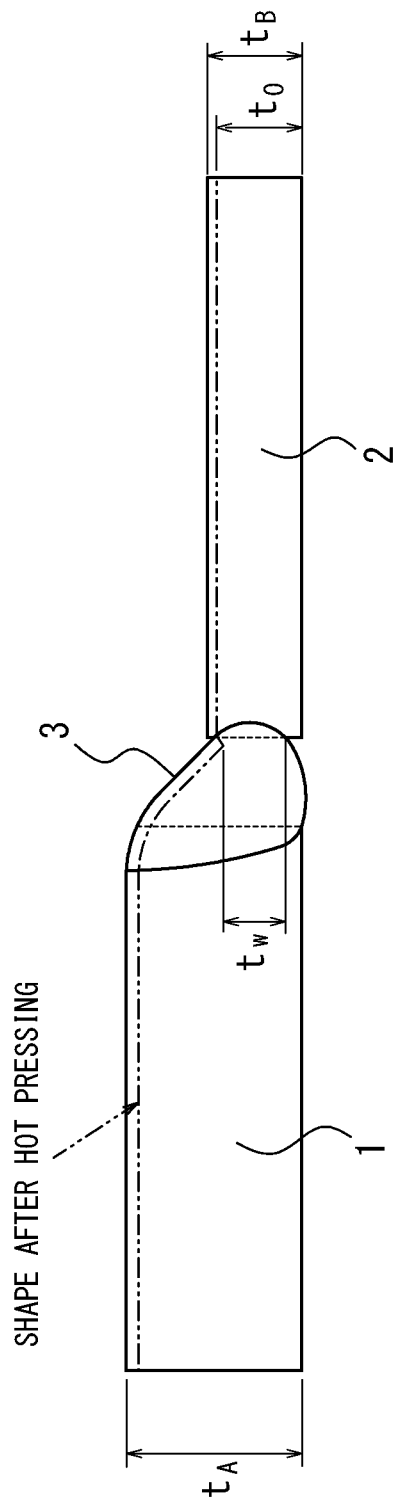

HOT-PRESSED MEMBER AND MANUFACTURING METHOD THEREFOR

TECHNICAL FIELD

The disclosure relates to a hot-pressed member suitable for use in a structural part of an automotive body.

The disclosure also relates to a hot-pressed member (hereafter also referred to as "tailored blank hot-pressed member") formed using a tailored blank material obtained by butt joining the ends of a plurality of steel sheets with different sheet thicknesses or steel types.

BACKGROUND

Demands for lighter automotive bodies to improve vehicle fuel efficiency and higher crashworthiness of automobiles have encouraged continued efforts to strengthen steel sheets used and reduce their sheet thicknesses. However, strengthening a steel sheet typically leads to lower press formability, and often makes it difficult to form the steel sheet in a desired member shape.

GB 1490535 A (PTL 1) proposes a forming technique called hot press forming, to achieve both easier forming and higher strength. This forming technique heats a steel sheet to soften it so as to ease press forming, and then forms the heated steel sheet using a press mold composed of a die and a punch and simultaneously quenches the steel sheet, thus achieving both easier forming and higher strength.

However, this technique has the following problem. The steel sheet needs to be heated to a high temperature of $Ac_3$ point or more before hot press forming, in order to obtain high strength after press forming. This causes scale (iron oxide) to form on the surface of the steel sheet. The scale peels during hot press forming, and damages the press mold and the surface of the hot press formed body (member).

Besides, the scale remaining on the surface of the formed body not only causes poor appearance and lower coating adhesion property, but also has high electric resistance and hinders resistance spot welding which is mainly employed when assembling an automotive body.

Accordingly, in the case of performing hot press forming, a treatment such as shot blasting is typically performed to remove the scale on the surface of the formed body. A treatment such as shot blasting, however, complicates the manufacturing process, and leads to lower productivity.

This has created demands to develop a steel sheet for a hot-pressed member that suppresses the formation of scale during heating before hot pressing to ensure favorable coating property and corrosion resistance of a hot-pressed member and also ease resistance spot welding, without a treatment such as shot blasting.

As such a steel sheet for a hot-pressed member, a steel sheet coated on its surface is proposed. For example, an Al or Al alloy coated steel sheet such as the one described in JP 2003-82436 A (PTL 2) is in wide use.

The Al or Al alloy coated steel sheet has an Al or Al alloy coated layer on its surface. When the Al or Al alloy coated steel sheet is heated to the austenite range of $Ac_3$ point or more, Fe in the base steel sheet rapidly diffuses into the coated layer, as a result of which an alloy layer of Al and Fe is formed. This suppresses the formation of scale. Consequently, a hot-pressed member after hot press forming can be resistance spot welded, with no need to perform a treatment such as pickling or shot blasting.

Meanwhile, tailored blank materials have been put to practical use, as means for improving the yield rate of pressed parts of automotive members. A tailored blank material is a raw material for pressing obtained by butting the end surfaces of a plurality of types of steel sheets with different sheet thicknesses or steel types and joining them by laser welding, plasma welding, or the like to form a blank of a necessary size depending on the purpose. Such a technique can be used to arrange, for example, a high strength steel sheet in a site required to have high strength, an anti-corrosion steel sheet in a site required to have corrosion resistance, and mild steel in other sites. In this way, significant reduction in weight and cost can be achieved while ensuring necessary properties.

Tailored blank materials have been conventionally formed by cold pressing. However, the problem of formability such as spring back associated with the strengthening of steel sheets in recent years is also serious in tailored blank materials.

In view of this, JP 2004-58082 A (PTL 3) discloses a technique of applying hot press forming to a tailored blank material.

With the technique in PTL 3, in a state where a tailored blank material is heated to a high temperature, the tailored blank material is press formed and quenched. This enables the integral forming of a member having both a high-strength site and a low-strength site (a site composed of a steel sheet with small sheet thickness or a steel sheet with low quench hardenability) while ensuring favorable shape fixability.

It is, however, known from JP H11-277266 A (PTL 4) and the like that the following problem may arise in the case of using, in the technique as described in PTL 3, an Al or Al alloy coated steel sheet widely used as a coated steel sheet for hot pressing.

During laser welding to yield a tailored blank material, Al contained in the Al or Al alloy coated layer mixes in the weld metal. This decreases the quench hardenability of the weld metal during cooling after hot pressing, and lowers the strength of the weld metal (joining portion) of the member obtained after hot pressing, making it impossible to achieve sufficient strength.

To solve this problem, for example, JP 2009-534529 A (PTL 5) discloses a technique of removing the Al or Al alloy coated layer of the part to be welded of each sheet, before welding.

JP 2013-204090 A (PTL 6) discloses a tailored blank for hot stamping obtained by butt laser welding Al coated steel sheets with different strengths.

According to PTL 6, a tailored blank is obtained by combining steel sheets to be butt welded so that the average concentration of Al in the weld metal formed by butt laser welding is 0.3 mass % or more and 1.5 mass % or less, the $Ac_3$ point temperature of the weld metal is 1250° C. or less, and the product of the hardness of the weld metal after hot stamping and the thickness of the thinnest portion of the weld metal is higher than the product of the hardness of the low-strength side steel sheet after hot stamping and the sheet thickness of the steel sheet.

JP 4867319 B (PTL 7) discloses a technique of manufacturing a hot-pressed member having a sufficiently hardened weld by limiting the amount of oxygen of the weld of a tailored blank material to 0.005 mass % or less to reduce oxides in the weld metal, thus suppressing austenite grain size refinement during heating for hot pressing to ensure quench hardenability during press mold forming and cooling.

CITATION LIST

Patent Literatures

PTL 1: GB 1490535 A
PTL 2: JP 2003-82436 A
PTL 3: JP 2004-58082 A
PTL 4: JP H11-277266 A
PTL 5: JP 2009-534529 A
PTL 6: JP 2013-204090 A
PTL 7: JP 4867319 B

SUMMARY

Technical Problem

The method of performing welding after removing the Al or Al alloy coated layer in PTL 5 requires an additional step of removing the coated layer. Besides, removing a wide coated layer causes a large portion to have poor corrosion resistance.

The welding method of limiting the average concentration of Al in the weld metal to 0.3 mass % or more and 1.5 mass % or less in PTL 6 has difficulty in selecting welding conditions, because there are many factors affecting the average concentration of Al in the weld metal such as the butting state including a weld gap, the steel sheet thickness, the coating amount, and the laser target position. PTL 6 mentions adjusting the Al concentration in the weld metal by adding filler wires. This, however, causes an increase in cost.

PTL 7 does not mention at all about the influence of the coating. Depending on the coating composition or the coating amount, the weld metal cannot be sufficiently hardened during cooling after hot pressing, and as a result cannot obtain sufficient strength. Besides, even when the method in PTL 7 is used, the weld metal may become softer than the base material after hot pressing. There is thus a possibility of a fracture in the weld in the case of conducting a fracture test on actual parts.

It could be helpful to provide a tailored blank hot-pressed member having sufficient strength in weld metal (steel sheet joining portion) after hot pressing, without performing control of Al mixing in the weld metal such as coated layer removal or filler wire addition which has been required in the case of obtaining a tailored blank material from Al or Al alloy coated steel sheets.

It could also be helpful to provide a manufacturing method for the tailored blank hot-pressed member.

Solution to Problem

As a result of careful examination, we discovered the following:

(1) To suppress Al mixing in the weld metal from the coated layer of each steel sheet during joining when obtaining a tailored blank material as a raw material for hot pressing, it is effective to use a Zn or Zn alloy coated steel sheet having Zn as a main component.

Zn has a low boiling point of 907° C. Accordingly, Zn evaporates due to thermal conduction from the weld metal during laser or plasma welding, and does not mix in the weld metal. Moreover, since the Al content in the Zn or Zn alloy coated layer is low, Al mixing in the weld metal can be suppressed.

Hence, the use of Zn or Zn alloy coated steel sheets as the steel sheets joined when obtaining the tailored blank material can prevent a decrease in quench hardenability of the weld metal, while ensuring corrosion resistance.

(2) Even when the steel sheets are Zn or Zn alloy coated, however, in the case where the coated layers of the steel sheets are pure Zn coated layers, hot-dip galvanized layers, or galvannealed layers, sufficient strength in the weld metal after hot pressing cannot necessarily be ensured depending on the butting state, the state of the end surfaces to be butted, and the like.

(3) We accordingly conducted more detailed examination to ensure sufficient strength in the weld metal after hot pressing.

As a result, we discovered the following:
Sufficient strength in the weld metal of the hot-pressed member can be ensured by:

(a) using a Zn or Zn alloy coated steel sheet having a pure Zn coated layer, a hot-dip galvanized layer, or a galvannealed layer, as each blank sheet of the tailored blank material; and (b) setting the thickness of the thinnest portion in the weld metal (the joining portion between the sites (hereafter also referred to as "sites of the hot-pressed member") formed by the respective coated steel sheets after hot pressing) in the hot-pressed member to be 0.9 times or more the thickness of the thinnest site of the sites of the hot-pressed member.

A fracture in the weld metal can be effectively prevented in this way.

(4) We also carefully examined the components of the coated layer formed on the steel sheet surface.

We consequently discovered that, by using Zn as a main component and adding a predetermined amount of Ni and also controlling the coating weight per side to a predetermined range, Ni contained in the coated layer flows into the weld metal during welding, as a result of which the quench hardenability of the weld metal during cooling after hot pressing is enhanced to improve the strength of the weld metal.

We further discovered that, in the case of using a steel sheet having such a Zn—Ni alloy coated layer as each blank sheet of the tailored blank material, sufficient strength in the weld metal of the hot-pressed member can be ensured by setting the thickness of the thinnest portion in the weld metal (the joining portion between the sites of the hot-pressed member) in the hot-pressed member to be 0.8 times or more the thickness of the thinnest site of the sites of the hot-pressed member, with it being possible to effectively prevent a fracture in the weld metal.

The disclosure is based on these discoveries and further studies.

We thus provide:

1. A hot-pressed member formed using a tailored blank material obtained by butt joining respective ends of two or more coated steel sheets, wherein a coated layer in a surface of each of the coated steel sheets is a Zn or Zn alloy coated layer, the hot-pressed member has two or more sites formed by the respective coated steel sheets and at least one joining portion between the sites, $t_w/t_0 \geq 0.9$, where $t_w$ is a thickness of a thinnest portion in the joining portion and $t_0$ is a thickness of a thinnest site of the sites, and a tensile strength of each of the sites is 1180 MPa or more.

2. A method for manufacturing the hot-pressed member according to 1., the method comprising: butting respective ends of two or more coated steel sheets as a raw material and joining the ends by laser welding or plasma welding, to obtain a tailored blank material, each of the coated steel sheets having a Zn or Zn alloy coated layer; and heating the obtained tailored blank material to a temperature range of an Ac$_3$ transformation point to 1000° C., and then cooling the tailored blank material and hot-pressing the cooled tailored blank material at a temperature of 600° C. or more.

3. A hot-pressed member formed using a tailored blank material obtained by butt joining respective ends of two or more coated steel sheets, wherein a coated layer in a surface of each of the coated steel sheets is a Zn—Ni alloy coated layer that contains 10 mass % or more and 25 mass % or less Ni and whose coating weight per side is 10 g/m$^2$ or more and 90 g/m$^2$ or less, the hot-pressed member has two or more sites formed by the respective coated steel sheets and at least one joining portion between the sites, $t_w/t_0 \geq 0.8$, where $t_w$ is a thickness of a thinnest portion in the joining portion and $t_0$ is a thickness of a thinnest site of the sites, and a tensile strength of each of the sites is 1180 MPa or more.

4. A method for manufacturing the hot-pressed member according to 3., the method comprising: butting respective ends of two or more coated steel sheets as a raw material and joining the ends by laser-arc hybrid welding with TIG welding preceding laser welding, to obtain a tailored blank material, each of the coated steel sheets having a Zn—Ni alloy coated layer that contains 10 mass % or more and 25 mass % or less Ni and whose coating weight per side is 10 g/m$^2$ or more and 90 g/m$^2$ or less; and heating the obtained tailored blank material to a temperature range of an Ac$_3$ transformation point to 1000° C., and then cooling the tailored blank material and hot-pressing the cooled tailored blank material at a temperature of 600° C. or more.

Advantageous Effect

It is thus possible to stably obtain a tailored blank hot-pressed member having sufficient strength in weld metal (the joining portion between the sites of the hot-pressed member) after hot pressing as well as corrosion resistance, without performing control of Al mixing in the weld metal such as coated layer removal or filler wire addition.

BRIEF DESCRIPTION OF THE DRAWINGS

In the accompanying drawings:
FIG. 1 is a schematic sectional view of a tailored blank material obtained by butt joining coated steel sheets.

DETAILED DESCRIPTION

Detailed description is given below.

The disclosure relates to a hot-pressed member formed using a tailored blank material obtained by butt joining respective ends of two or more coated steel sheets. The tailored blank material used here is obtained by butt joining respective ends of two or more coated steel sheets without removing their coated layers beforehand.

The hot-pressed member has two or more sites formed by the respective coated steel sheets constituting the tailored blank material, and at least one joining portion between the sites.

The tensile strength of each of the sites of the hot-pressed member is 1180 MPa or more. No upper limit is placed on the tensile strength of each of the sites of the hot-pressed member, yet the upper limit is typically 2000 MPa.

An example of the combination of steel sheets in the tailored blank material is a combination of a coated steel sheet and a non-coated cold rolled steel sheet used for a part that has both a site required to have rust resistance and a site not required to have rust resistance. This achieves reduction in cost.

Another example of the combination of steel sheets is a combination of a steel sheet with large sheet thickness (for example, about 1.2 mm to 2.3 mm) and a steel sheet with small sheet thickness (for example, about 0.8 mm to 1.8 mm) used for a part that has both a site required to have particularly high strength (a site whose bearable load represented by the product of the tensile strength and cross-sectional area of the site is high) and a site not required to have such strength. This achieves reduction in both weight and cost. The steel sheet with large sheet thickness forms the site required to have high strength and the steel sheet with small sheet thickness forms the site not required to have such strength, after hot pressing.

The disclosure especially concerns a hot-pressed member formed using a tailored blank material obtained from the latter combination of a steel sheet with large sheet thickness and a steel sheet with small sheet thickness.

Note, however, that the disclosure also includes a hot-pressed member formed using a tailored blank material made up of steel sheets with the same sheet thickness.

The following describes the coated layer formed in the surface of each coated steel sheet mentioned above.

In the disclosure, the coated layer of each coated steel sheet constituting the tailored blank material is not a conventionally widely used Al or Al alloy coating, but a Zn or Zn alloy coating.

This suppresses Al mixing in the weld metal from the coated layer during joining for obtaining the tailored blank material. Hence, the steel sheets can be welded without removing their coated layers.

Al has a melting point of 660° C. and a boiling point of 2513° C. Accordingly, Al melts but does not evaporate during laser or plasma welding. Hence, in the case of using an Al or Al alloy coated steel sheet, molten Al mixes in the weld metal during joining by laser or plasma welding or the like, unless the coated layer is removed beforehand.

In the case of using a Zn or Zn alloy coated steel sheet, on the other hand, Zn evaporates before a laser or plasma arc reaches due to thermal conduction from the weld metal during laser or plasma welding, because Zn has a relatively low boiling point of 907° C. Consequently, Zn does not mix in the weld metal, and so does not affect the quench hardenability of the weld metal during cooling after hot pressing.

Thus, in the case of using Zn or Zn alloy coated steel sheets as the steel sheets constituting the tailored blank material, the steel sheets can be welded with their coated layers, with there being no need of an additional step of removing the coated layers beforehand as required in the case of Al or Al alloy coated steel sheets.

Examples of the Zn or Zn alloy coated layer of the coated steel sheet include a pure Zn coated layer, a hot-dip galvanized layer, a galvannealed layer, and a Zn—Ni alloy coated layer containing a predetermined amount of Ni.

In the pure Zn coated layer, the components other than Zn are incidental impurities. The hot-dip galvanized layer contains Al: 0.01 mass % to 1.0 mass % and incidental impurities, other than Zn. The galvannealed layer contains Al: 0.01 mass % to 1.0 mass %, Fe: 7 mass % to 15 mass %, and incidental impurities, other than Zn.

The coating weight per side suitable in the case of forming the pure Zn coated layer, the hot-dip galvanized layer, or the galvannealed layer is not limited. However, the coating weight per side is preferably 30 g/m$^2$ or more and 90 g/m$^2$ or less. If the coating weight per side is less than 30 g/m$^2$, post-coating corrosion resistance may decrease. If the coating weight per side is more than 90 g/m$^2$, adhesion property decreases, and also higher cost is required. Besides, in the case of the hot-dip galvanized layer or the galvannealed layer, the amount of Al mixing in the weld metal during joining for obtaining the tailored blank material increases, which is likely to cause lower strength of the weld metal.

Accordingly, the coating weight per side in the pure Zn coated layer, the hot-dip galvanized layer, or the galvannealed layer is preferably 30 g/m² or more and 90 g/m² or less. The coating weight per side is more preferably 50 g/m² or more. The coating weight per side is more preferably 70 g/m² or less.

Of the aforementioned Zn or Zn alloy coated layers, the Zn—Ni alloy coated layer containing the predetermined amount of Ni is preferable.

While Zn evaporates due to heat during laser or plasma welding, Ni has a high melting point and so is incorporated into the weld metal without evaporating even by heat during welding. Ni is an element that increases equivalent carbon content Ceq, as indicated by the following Expression (1). Ni mixes in the weld metal from the coated layer during joining for obtaining the tailored blank material, as a result of which the equivalent carbon content of the weld metal becomes higher than that of the steel sheets to be joined. This enhances the quench hardenability of the weld metal during hot pressing, with it being possible to obtain high strength in the weld metal (the joining portion between the sites of the hot-pressed member) after hot pressing.

$$Ceq=[\% C]+[\% Mn]/6+([\% Cu]+[\% Ni])/15+([\% Cr]+[\% Mo]+[\% V])/5 \quad (1)$$

where [% M] denotes the content of M element (mass %).

In addition, it is important that the Zn—Ni alloy coated layer satisfies the following requirements:

Ni content in the Zn—Ni alloy coated layer: 10 mass % or more and 25 mass % or less.

As mentioned above, Ni contained in the coated layer is incorporated into the weld metal during laser welding or plasma welding for obtaining the tailored blank material, thus enhancing the quench hardenability of the weld metal (the joining portion between the sites of the hot-pressed member) during cooling after hot pressing and contributing to higher strength of the weld metal after hot pressing.

When the Ni content in the Zn—Ni alloy coated layer is 10 mass % to 25 mass %, γ phase with a high melting point of 881° C. having a crystal structure of any of $Ni_2Zn_{11}$, $NiZn_3$, and $Ni_5Zn_{21}$ forms. This minimizes zinc oxide forming reaction in the coated layer surface during the heating process. Moreover, the coated layer remains as γ phase after hot pressing, so that excellent perforation corrosion resistance is exhibited by the sacrificial protection effect of Zn.

Although the formation of γ phase when the Ni content is 10 mass % to 25 mass % does not necessarily coincide with the phase equilibrium diagram of Ni—Zn alloy, this is probably because the coated layer forming reaction by electroplating or the like progresses in non-equilibrium. The γ phase of $Ni_2Zn_{11}$, $NiZn_3$, or $Ni_5Zn_2$ can be observed by X-ray diffraction method or electron diffraction method using transmission electron microscopy (TEM).

If the Ni content in the Zn—Ni alloy coated layer is less than 10 mass %, the quench hardenability improving effect by the mixing of Ni in the weld metal from the coated layer is low. Particularly in the case where the thickness of the thinnest portion in the weld metal (the joining portion between the sites of the hot-pressed member) of the hot-pressed member is less than 0.8 times the thickness of the thinnest site of the sites of the hot-pressed member, sufficient strength cannot be obtained in the weld metal after hot pressing. If the Ni content is more than 25 mass %, Zn decreases whereas Ni having lower ionization tendency than Fe increases in the coated layer, causing lower post-coating corrosion resistance (corrosion resistance when the coating is damaged). Besides, the material cost increases.

Accordingly, the Ni content in the Zn—Ni alloy coated layer is 10 mass % or more and 25 mass % or less. The Ni content in the Zn—Ni alloy coated layer is preferably 11 mass % or more. The Ni content in the Zn—Ni alloy coated layer is preferably 15 mass % or less.

In the Zn—Ni alloy coated layer, the components other than Zn and Ni are incidental impurities.

Coating weight per side: 10 g/m² or more and 90 g/m² or less

If the coating weight per side is less than 10 g/m², a sufficient amount of Ni is not incorporated into the weld metal during joining for obtaining the tailored blank material, and so the weld metal quench hardenability improving effect is insufficient. Besides, post-coating corrosion resistance is likely to degrade. The coating weight per side is therefore 10 g/m² or more. The coating weight per side is preferably 11 g/m² or more.

If the coating weight per side is more than 90 g/m², the post-coating corrosion resistance improving effect saturates, and the cost increases. The coating weight per side is therefore 90 g/m² or less. The coating weight per side is preferably 70 g/m² or less.

The Zn—Ni coating may be preceded by a Ni pre-coating.

The coated layer formation method is not limited, and may be a well-known method such as electroplating. The coating weight can be measured by melting the coating by hydrochloric acid or the like and analyzing the resulting solution by atomic absorption spectrometry or ICP optical emission spectrometry to quantify each of the Zn coating weight and the Ni coating weight.

The chemical composition of the base steel sheet of the coated steel sheet is not limited. In terms of obtaining a tensile strength of 1180 MPa or more in each site of the hot-pressed member, obtaining sufficient strength in the weld metal, and also forming a site required to have high strength with good shape fixability, the chemical composition preferably has high carbon content and high equivalent carbon content.

In particular, a hot rolled steel sheet and cold rolled steel sheet having a chemical composition containing, in mass %, C: 0.15 mass % to 0.5 mass %, Si: 0.05 mass % to 2.0 mass %, Mn: 0.5 mass % to 3 mass %, P: 0.1 mass % or less, S: 0.05 mass % or less, Al: 0.1 mass % or less, and N: 0.01 mass % or less with the balance being Fe and incidental impurities are preferable.

The preferable chemical composition is described below. In the following description, "%" representing content denotes "mass %" unless otherwise stated.

C: 0.15% to 0.5%

C is an element that improves the strength of the steel. To obtain a tensile strength (TS) of 1180 MPa or more in each site of the hot-pressed member, the C content is preferably 0.15% or more. If the C content is more than 0.5%, the fine blanking workability of the steel sheet decreases significantly. The C content is therefore in the range of 0.15% to 0.5%.

Si: 0.05% to 2.0%

Si is an element that improves the strength of the steel, as with C. To obtain a tensile strength (TS) of 1180 MPa or more in each site of the hot-pressed member, the Si content is preferably 0.05% or more. If the Si content is more than 2.0%, a surface defect called red scale increases significantly during hot rolling. Moreover, the rolling load increases, and the ductility of the hot rolled steel sheet degrades. If the Si content is more than 2.0%, coating performance during Zn coating treatment may be adversely affected. The Si content is therefore in the range of 0.05% to 2.0%.

Mn: 0.5% to 3%

Mn is an element effective in improving quench hardenability by inhibiting ferrite transformation. Mn is also an element effective in lowering the heating temperature before hot pressing, as it decreases the $Ac_3$ transformation point. To achieve these effects, the Mn content needs to be 0.5% or more. If the Mn content is more than 3%, Mn segregates, which reduces the uniformity of properties in the steel sheet and each site of hot-pressed member. The Mn content is therefore in the range of 0.5% to 3%.

P: 0.1% or less

If the P content is more than 0.1%, P segregates, which reduces the uniformity of properties in the steel sheet and each site of the hot-pressed member. Toughness also decreases significantly. The P content is therefore 0.1% or less. Excessive dephosphorization, however, leads to an increase in refining cost, and so the P content is preferably 0.001% or more.

S: 0.05% or less

If the S content is more than 0.05%, the toughness in each site of the hot-pressed member decreases. The S content is therefore 0.05% or less. Excessive desulfurization, however, leads to an increase in refining cost, and so the S content is preferably 0.0001% or more.

Al: 0.1% or less

If the Al content is more than 0.1%, the fine blanking workability and quench hardenability of the steel sheet decrease. The Al content is therefore 0.1% or less. Al is an element that serves as a deoxidizer. To achieve this effect, the Al content is preferably 0.005% or more.

N: 0.01% or less

If the N content is more than 0.01%, MN nitride forms during hot rolling or during heating before hot pressing, as a result of which the fine blanking workability and quench hardenability of the steel sheet decrease. The N content is therefore 0.01% or less. Excessive denitrification, however, leads to an increase in refining cost, and so the N content is preferably 0.0001% or more.

While the basic components have been described above, at least one element selected from Cr, Ti, B, and Sb may be optionally contained as appropriate.

Cr: 0.01% to 1%

Cr is an element effective in strengthening the steel and improving quench hardenability. To achieve these effects, the Cr content is preferably 0.01% or more. If the Cr content is more than 1%, a significant cost increase ensues. The upper limit of the Cr content is therefore preferably 1%.

Ti: 0.2% or less

Ti is an element effective in strengthening the steel and improving toughness by grain refinement. In addition, Ti forms a nitride more preferentially than the below-mentioned B, and so is an element effective in developing the quench hardenability improving effect by solute B. To achieve these effects, the Ti content is preferably 0.01% or more. If the Ti content is more than 0.2%, the rolling load during hot rolling increases extremely, and the toughness of the hot-pressed member decreases. The upper limit of the Ti content is therefore preferably 0.2%.

B: 0.0005% to 0.08%

B is an element effective in improving quench hardenability during cooling after hot pressing and improving toughness after hot pressing. To achieve these effects, the B content is preferably 0.0005% or more. If the B content is more than 0.08%, the rolling load during hot rolling increases extremely. Besides, martensite phase or bainite phase forms after hot rolling, causing steel sheet cracking and the like. The upper limit of the B content is therefore preferably 0.08%.

Sb: 0.003% to 0.03%

Sb has an effect of suppressing the formation of a decarburized layer in the surface layer part of the steel sheet from when the steel sheet is heated before hot pressing to when the steel sheet is cooled by the process of hot pressing. To achieve this effect, the Sb content is preferably 0.003% or more. If the Sb content is more than 0.03%, the rolling load increases, which causes lower productivity. Accordingly, the Sb content is preferably 0.003% or more. The Sb content is preferably 0.03% or less.

The components other than those described above are Fe and incidental impurities.

The coated steel sheets constituting the tailored blank material have been described above.

In the disclosure, it is also important that $t_w/t_0$ satisfies the following relationship depending on the type of the coated layer formed in the surface of each coated steel sheet, where $t_w$ is the thickness of the thinnest portion in the weld metal (the joining portion between the sites of the hot-pressed member) of the hot-pressed member and $t_0$ is the thickness of the thinnest site of the sites of the hot-pressed member.

$t_w/t_0 \geq 0.9$ (in the case where the coated layer formed in the surface of each coated steel sheet is a Zn or Zn alloy coated layer such as a pure Zn coated layer, a hot-dip galvanized layer, or a galvannealed layer)

A tailored blank hot-pressed member is required to have no fracture in its weld metal (the joining portion between the sites of the hot-pressed member).

For the tailored blank hot-pressed member, the bearable load can be calculated by the product of the tensile strength and the cross-sectional area. This means a fracture occurs in a region with a smaller value out of: the product of the tensile strength of the weld metal and the cross-sectional area of the thinnest portion of the weld metal; and the product of the tensile strength and cross-sectional area of each site of the hot-pressed member.

Especially in a tailored blank material obtained by joining steel sheets with different sheet thicknesses, the weld metal typically does not come into direct contact with the press mold during forming, so that the cooling rate during quenching is low or the cooling start temperature is low. Hence, the weld metal tends to decrease in tensile strength, and has a high possibility of a fracture.

In view of this, the tailored blank hot-pressed member according to the disclosure uses a Zn or Zn alloy coated steel sheet with low Al content as a raw material. This suppresses Al mixing when joining the steel sheets to obtain the tailored blank material, and prevents a decrease in strength of the weld metal after hot pressing.

If the thickness $t_w$ of the thinnest portion in the weld metal (the joining portion between the sites of the hot-pressed member) of the hot-pressed member is less than 0.9 times the thickness $t_0$ of the thinnest site of the sites of the hot-pressed member, however, a fracture tends to occur in the weld metal.

Accordingly, in the case where the coated layer formed in the surface of the coated steel sheet as a raw material is a Zn or Zn alloy coated layer such as a pure Zn coated layer, a hot-dip galvanized layer, or a galvannealed layer, the thickness $t_w$ of the thinnest portion in the joining portion between the sites of the hot-pressed member and the thickness to of the thinnest site of the sites of the hot-pressed member satisfy $t_w/t_0 \geq 0.9$. Preferably, $t_w/t_0 \geq 1.0$.

$t_w/t_0 \geq 0.8$ (in the case where the coated layer formed in the surface of each coated steel sheet is a Zn—Ni alloy coated layer that contains 10 mass % or more and 25 mass % or less Ni and whose coating weight per side is 10 g/m² or more and 90 g/m² or less)

In the case where the coated layer formed in the surface of the coated steel sheet is a Zn—Ni alloy coated layer from among Zn or Zn alloy coated layers, Ni mixes in the weld metal from the coated layer during joining for obtaining the tailored blank material and so the hardening of the weld metal is facilitated during cooling after hot pressing, as mentioned earlier. This results in sufficient tensile strength in the weld metal (the joining portion between the sites of the hot-pressed member) of the hot-pressed member, with it being possible to suppress a fracture in the weld metal more effectively.

If $t_w/t_0$ is less than 0.8, however, a fracture tends to occur in the weld metal.

Accordingly, in the case where the coated layer formed in the surface of the coated steel sheet is a Zn—Ni alloy coated layer that contains 10 mass % or more and 25 mass % or less Ni and whose coating weight per side is 10 g/m² or more and 90 g/m² or less, $t_w/t_0 \geq 0.8$. Preferably, $t_w/t_0 \geq 1.0$.

Joining for obtaining the tailored blank material may be performed by, for example, laser welding or plasma welding. In the case where the coated steel sheet having the aforementioned Zn—Ni alloy coated layer is used as a raw material, however, laser-arc hybrid welding with TIG welding preceding laser welding is preferable.

By using laser-arc hybrid welding with TIG welding preceding laser welding, the steel sheet surface and its vicinity, particularly the coated layer, melts widely by the arc of the preceding TIG welding, while the weld metal portion is limited to a narrow region by the laser welding. This increases the amount of Ni mixing in the weld metal from the coated layer, and improves the quench hardenability of the weld metal more effectively.

The joining conditions are not limited as long as piercing welding is achieved without humping. As an example, in the case of laser welding, the coated steel sheets may be butted on the opposite side to the laser irradiation surface with a gap of 0 mm to 0.3 mm, and welded with the conditions of laser power: 2.0 kW to 6.0 kW, focus position: the range of ±1.5 mm centering at the thick steel sheet surface, welding speed: 2.0 m/min to 6.0 m/min, and shielding gas: Ar or He.

As another example, in the case of laser-arc hybrid welding with TIG welding preceding laser welding, the coated steel sheets may be welded by performing the preceding TIG welding with the conditions of sweepback angle: 0° to 60°, distance between the electrode and the thick steel sheet: 10 mm to 20 mm, arc current: 80 A to 200 A (DCRP), shielding gas: He or Ar, and target position: the laser irradiation position to 10 mm in front of the laser irradiation position, and performing the laser welding with the conditions of laser power: 2.0 kW to 6.0 kW, welding speed: 2.0 m/min to 6.0 m/min, shielding gas: Ar or He, and focus position: the range of ±1.5 mm centering at the thick steel sheet surface.

Regarding the hot pressing conditions, the steel sheets are preferably heated to the temperature range of the $Ac_3$ transformation point or more and 1000° C. or less, allowed to naturally cool, and then hot-pressed at a temperature of 600° C. or more.

Here, the heating temperature before hot pressing is the $Ac_3$ transformation point or more, to form a hard phase such as martensite phase by quenching after hot pressing to thus strengthen the member. The upper limit of the heating temperature before hot pressing is 1000° C., because a heating temperature of more than 1000° C. causes the formation of a large amount of oxide layer in the coated layer surface, resulting in a thick oxide layer that hampers the generation of current path during resistance spot welding. The heating temperature mentioned here is the peak metal temperature of the steel sheet.

The $Ac_3$ transformation point can be calculated by the following Expression (2):

$$Ac_3 = 937.2 - 476.5[\% C] + 56[\% Si] - 19.7[\% Mn] - 16.3[\% Cu] - 26.6[\% Ni] - 4.9[\% Cr] + 38.1[\% Mo] + 124.8[\% V] + 136.3[\% Ti] + 198.4[\% Al] + 3315[\% B] \quad (2)$$

where [% M] denotes the content of M element (mass %).

Moreover, if the average heating rate during heating before hot pressing is 60° C./s or more, the formation of the thick oxide layer in the coated layer surface can be suppressed more effectively, thus improving resistance spot weldability.

The oxide layer formed in the coated layer surface increases as the high temperature residence time during which the steel sheet is exposed to high temperature increases. When the average heating rate is higher, the high temperature residence time is shorter, and as a result the formation of the oxide layer in the coated layer surface can be suppressed.

The holding time at the heating temperature (the highest end-point temperature of the steel sheet) is not limited, yet is preferably short in order to suppress the formation of the oxide layer. The holding time is preferably 120 s or less. The holding time is more preferably 60 s or less. The holding time is further preferably 10 s or less. The holding time may be 0 s (no holding).

Examples of the method of heating before hot pressing include heating in an electric heating furnace, a gas furnace, etc., flame heating, electrical heating, high-frequency heating, and induction heating. For an average heating rate of 60° C./s or more, electrical heating, high-frequency heating, induction heating, and the like are preferable.

The heated tailored blank material is then allowed to naturally cool, and hot-pressed at a temperature of 600° C. or more. This is because, if the steel sheets having the composition described above are allowed to naturally cool to less than 600° C., the formation of ferrite phase begins before hot pressing, making it impossible to obtain sufficient tensile strength.

No upper limit is placed on the hot pressing start temperature, yet the upper limit is typically about 800° C.

Examples

As base steel sheets, cold rolled steel sheets (steel sample ID a) with various sheet thicknesses having a chemical composition containing, in mass %, C: 0.23%, Si: 0.25%, Mn: 1.2%, P: 0.01%, S: 0.01%, Al: 0.03%, N: 0.005%, Cr: 0.2%, Ti: 0.02%, B: 0.0022%, and Sb: 0.008% with the balance being Fe and incidental impurities and having an $Ac_3$ transformation point of 833° C. and cold rolled steel sheets (steel sample ID b) with various sheet thicknesses having a chemical composition containing, in mass %, C: 0.23%, Si: 0.25%, Mn: 2.0%, P: 0.02%, S: 0.01%, Al: 0.03%, and N: 0.004% with the balance being Fe and incidental impurities and having an $Ac_3$ transformation point of 808° C. were produced. Galvannealing (GA), Zn alloy electroplating (Zn—Ni), and Al—Si coating (Al-10% Si)

were applied to the surfaces of these cold rolled steel sheets, to prepare various coated steel sheets.

Regarding Zn alloy electroplated steel sheets, the Ni content and the coating amount in their coatings were varied.

Test pieces of 150 mm×250 mm were collected from the obtained coated steel sheets, and the same type of coated steel sheets (the steel sheet with larger sheet thickness is set as a steel sheet A and the steel sheet with smaller sheet thickness as a steel sheet B. In the case where the steel sheets have the same sheet thickness, the steel sheets A and B are determined in any way) having the sheet thicknesses in Table 1 were butted on the opposite side to the laser irradiation surface as illustrated in FIG. 1, and subjected to laser welding or laser-arc hybrid welding with TIG welding preceding laser welding, to obtain a tailored blank material. In FIG. 1, reference sign 1 is the steel sheet A (the site formed by the steel sheet A in the hot-pressed member, hereafter also referred to as "site A"), 2 is the steel sheet B (the site formed by the steel sheet B in the hot-pressed member, hereafter also referred to as "site B"), 3 is the weld metal (the joining portion between the sites A and B), $t_0$ is the sheet thickness of the steel sheet A, $t_B$ is the sheet thickness of the steel sheet B, $t_w$ is the thickness of the thinnest portion in the joining portion between the sites A and B of the hot-pressed member after hot pressing, and $t_0$ is the thickness of the site B.

Laser welding was carried out using YAG laser of 0.6 mm in condensing diameter, with the conditions of laser power: 3.0 kW, welding speed: 3 m/min, shielding gas: Ar (20 L/min), and focus position: the surface of the thick steel sheet (steel sheet A). Laser-arc hybrid welding with TIG welding preceding laser welding was carried out by performing the preceding TIG welding with the conditions of sweepback angle: 60°, electrode-steel sheet distance: 15 mm, arc current: 100 A (DCRP), shielding gas: Ar (20 L/min), and target position: the same as the laser irradiation position, and performing the laser welding using YAG laser of 0.6 mm in condensing diameter, with the conditions of laser power: 3.0 kW, welding speed: 3 m/min, shielding gas: Ar (20 L/min), and focus position: the surface of the thick steel sheet (steel sheet A). The thickness of the joining portion was adjusted by varying the gap between the steel sheets in the range of 0 mm to 0.4 mm.

Each tailored blank material yielded in this way was hot-pressed with the following conditions, to obtain a hot-pressed member.

Each tailored blank material was heated in atmosphere in an electric heating furnace to 900° C. for 180 s (the thick steel sheet (steel sheet A) temperature was measured) and, without being held at the temperature, removed from the electric heating furnace and air cooled to 700° C. in atmosphere. The tailored blank material was then immediately squeezed by a press mold to be hot-pressed, thus obtaining a hot-pressed member having the shape as illustrated in FIG. 1.

A JIS Z 2241 No. 5 tensile test piece was cut from each of the sites A and B of the obtained hot-pressed member, and the tensile strength of each of the sites A and B was measured. Table 1 lists the measurement results.

Moreover, a JIS Z 3121 No. 1A butt weld joint tensile test piece was collected from the joining portion between the sites A and B, and a sample for joining portion cross-sectional shape observation was collected from both sides of the test piece. The thickness $t_w$ (mm) of the thinnest portion in the weld metal (the joining portion between the sites A and B) was measured from the sample for cross-sectional shape observation, and $t_w/t_0$ was calculated from $t_w$ (mm) and the thickness $t_0$ (mm) of the site B. Table 1 lists the values of $t_w/t_0$.

Each butt weld joint tensile test piece obtained in this way was subjected to a tensile test at a tensile rate of 10 mm/min, and evaluated as pass when a fracture occurred in the site B, and fail when a fracture occurred in the weld metal (the joining portion between the sites A and B). Table 1 lists the results.

Furthermore, the post-coating corrosion resistance of each obtained tailored blank hot-pressed member was evaluated.

First, a test piece of 70 mm×150 mm was collected from each of the sites A and B of the hot-pressed member, and subjected to chemical conversion treatment and electrode-position coating. The chemical conversion treatment was performed using PB-L3020 made by Nihon Parkerizing Co., Ltd., with standard conditions. The electrodeposition coating was performed using GT-10 made by Kansai Paint Co., Ltd., with the conditions of coating with a voltage of 200 V and then baking at 170° C. for 20 min, with a film thickness of 20 μm. The obtained electrodeposition coated test piece was then cross-cut by a cutter and, after sealing the non-cut surface and the ends, subjected to a salt spray test for 480 hours according to JIS Z 2371 (2000). The test piece after the test was washed and dried, and a peeling test was conducted on the cut portion using adhesive cellophane tape to measure the one-side maximum peeling width.

From the one-side maximum width, the post-coating corrosion resistance was evaluated as pass or fail based on the following criteria:

pass: one-side maximum peeling width ≤5 mm
fail: one-side maximum peeling width >5 mm.

TABLE 1

| | Steel sheet A | | | | | Steel sheet B | | | | |
|---|---|---|---|---|---|---|---|---|---|---|
| | | | Coated layer | | | | | Coated layer | | |
| No. | Steel sample ID | Sheet thickness $t_A$ (mm) | Type | Ni content (mass %) | Coating weight per side (g/m²) | Steel sample ID | Sheet thickness $t_B$ (mm) | Type | Ni content (mass %) | Coating weight per side (g/m²) |
| 1 | a | 1.8 | Zn-Ni | 12 | 60 | a | 1.0 | Zn-Ni | 12 | 60 |
| 2 | a | 1.8 | Zn-Ni | 12 | 60 | a | 1.0 | Zn-Ni | 12 | 60 |
| 3 | a | 1.8 | Zn-Ni | 12 | 60 | a | 1.0 | Zn-Ni | 12 | 60 |
| 4 | a | 1.8 | Zn-Ni | 12 | 60 | a | 1.0 | Zn-Ni | 12 | 60 |
| 5 | a | 1.8 | Zn-Ni | 12 | 60 | a | 1.0 | Zn-Ni | 12 | 60 |
| 6 | a | 1.8 | Zn-Ni | 12 | 60 | a | 1.0 | Zn-Ni | 12 | 60 |
| 7 | a | 1.8 | GA | — | 60 | a | 1.0 | GA | — | 60 |
| 8 | a | 1.8 | GA | — | 60 | a | 1.0 | GA | — | 60 |
| 9 | a | 1.8 | GA | — | 60 | a | 1.0 | GA | — | 60 |

TABLE 1-continued

| No. | | | | | | | | | | |
|---|---|---|---|---|---|---|---|---|---|---|
| 10 | a | 1.8 | GA | — | 60 | a | 1.0 | GA | — | 60 |
| 11 | a | 1.8 | Al-10% Si | — | 60 | a | 1.0 | Al-10% Si | — | 60 |
| 12 | a | 1.8 | Al-10% Si | — | 60 | a | 1.0 | Al-10% Si | — | 60 |
| 13 | a | 1.8 | Al-10% Si | — | 60 | a | 1.0 | Al-10% Si | — | 60 |
| 14 | a | 1.8 | Al-10% Si | — | 60 | a | 1.0 | Al-10% Si | — | 60 |
| 15 | a | 1.8 | Al-10% Si | — | 60 | a | 1.0 | Al-10% Si | — | 60 |
| 16 | b | 1.8 | Zn-Ni | 10 | 90 | b | 1.0 | Zn-Ni | 10 | 90 |
| 17 | b | 1.8 | Zn-Ni | 10 | 30 | b | 1.0 | Zn-Ni | 10 | 30 |
| 18 | b | 1.8 | Zn-Ni | 10 | 10 | b | 1.0 | Zn-Ni | 10 | 10 |
| 19 | b | 1.8 | Zn-Ni | 10 | 5 | b | 1.0 | Zn-Ni | 10 | 5 |
| 20 | b | 1.8 | Zn-Ni | 5 | 10 | b | 1.0 | Zn-Ni | 5 | 10 |
| 21 | b | 1.8 | Zn-Ni | 25 | 60 | b | 1.0 | Zn-Ni | 25 | 60 |
| 22 | b | 1.2 | Zn-Ni | 12 | 60 | b | 1.0 | Zn-Ni | 12 | 60 |
| 23 | b | 1.8 | Zn-Ni | 12 | 60 | b | 1.6 | Zn-Ni | 12 | 60 |
| 24 | b | 1.6 | Zn-Ni | 12 | 60 | b | 1.6 | Zn-Ni | 12 | 60 |
| 25 | a | 1.8 | Zn-Ni | 12 | 60 | a | 1.0 | Zn-Ni | 12 | 60 |

| No. | Joining method | Tensile strength of site A (MPa) | Tensile strength of site B (MPa) | $t_w/t_0$ | Tensile test result Fracture position | Post-coating corrosion resistance test result | Remarks |
|---|---|---|---|---|---|---|---|
| 1 | Laser | 1477 | 1490 | 1.00 | Site B | Pass | Example |
| 2 | Laser | 1520 | 1522 | 0.90 | Site B | Pass | Example |
| 3 | Laser | 1533 | 1540 | 0.85 | Site B | Pass | Example |
| 4 | Laser | 1490 | 1493 | 0.82 | Site B | Pass | Example |
| 5 | Laser | 1499 | 1520 | 0.80 | Site B | Pass | Example |
| 6 | Laser | 1505 | 1530 | 0.75 | Weld metal | Pass | Comparative Example |
| 7 | Laser | 1483 | 1498 | 0.99 | Site B | Pass | Example |
| 8 | Laser | 1550 | 1555 | 0.95 | Site B | Pass | Example |
| 9 | Laser | 1490 | 1501 | 0.90 | Site B | Pass | Example |
| 10 | Laser | 1470 | 1488 | 0.86 | Weld metal | Pass | Comparative Example |
| 11 | Laser | 1520 | 1537 | 0.99 | Weld metal | Fail | Comparative Example |
| 12 | Laser | 1505 | 1522 | 0.89 | Weld metal | Fail | Comparative Example |
| 13 | Laser | 1514 | 1519 | 0.86 | Weld metal | Fail | Comparative Example |
| 14 | Laser | 1488 | 1498 | 0.83 | Weld metal | Fail | Comparative Example |
| 15 | Laser | 1501 | 1514 | 0.77 | Weld metal | Fail | Comparative Example |
| 16 | Laser | 1541 | 1550 | 0.81 | Site B | Pass | Example |
| 17 | Laser | 1532 | 1544 | 0.81 | Site B | Pass | Example |
| 18 | Laser | 1520 | 1537 | 0.80 | Site B | Pass | Example |
| 19 | Laser | 1533 | 1540 | 0.82 | Weld metal | Fail | Comparative Example |
| 20 | Laser | 1499 | 1520 | 0.80 | Weld metal | Fail | Comparative Example |
| 21 | Laser | 1540 | 1551 | 0.83 | Site B | Pass | Example |
| 22 | Laser | 1527 | 1534 | 0.81 | Site B | Pass | Example |
| 23 | Laser | 1510 | 1522 | 0.80 | Site B | Pass | Example |
| 24 | Laser | 1508 | 1524 | 0.83 | Site B | Pass | Example |
| 25 | Laser-arc hybrid | 1497 | 1511 | 0.82 | Site B | Pass | Example |

As can be seen from Table 1, Examples Nos. 1 to 5, 7 to 9, 16 to 18, and 21 to 25 all fractured in the site B and not in the weld metal in the tensile test, and also had favorable post-coating corrosion resistance.

Of the samples using GA (galvannealed) steel sheets as coated steel sheets, No. 10 not satisfying $t_w/t_0 \geq 0.9$ did not have sufficient strength in the weld metal, and fractured in the weld metal in the tensile test.

Nos. 11 to 15 using Al—Si coated steel sheets as coated steel sheets all did not have sufficient strength in the weld metal, and fractured in the weld metal in the tensile test. Their post-coating corrosion resistance was also insufficient.

Even in the case where coated steel sheets having Zn—Ni alloy coated layers were used, Nos. 19 and 20 not satisfying the appropriate range of the coating weight or Ni content did not have sufficient strength in the weld metal, and fractured in the weld metal in the tensile test. Their post-coating corrosion resistance was also insufficient.

REFERENCE SIGNS LIST 1 steel sheet A (site A)
2 steel sheet B (site B)
3 weld metal (joining portion between sites A and B)

The invention claimed is:

1. A hot-pressed member formed using a tailored blank material obtained by butt joining respective ends of two or more coated steel sheets,
   wherein a coated layer in a surface of each of the coated steel sheets is a Zn—Ni alloy coated layer that contains 10 mass % or more and 25 mass % or less Ni and whose coating weight per side is 10 g/m² or more and 90 g/m² or less,
   the hot-pressed member has two or more sites formed by the respective coated steel sheets and at least one joining portion between the sites,
   $t_w/t_0 \geq 0.8$, where $t_w$ is a thickness of a thinnest portion in the joining portion and $t_0$ is a thickness of a thinnest site of the sites,
   a tensile strength of each of the sites is 1180 MPa or more, and
   the joining portion contains Ni derived from the coated layers.

2. A method for manufacturing the hot-pressed member according to claim 1, the method comprising:
   butting respective ends of two or more coated steel sheets as a raw material and joining the ends by laser-arc hybrid welding with TIG welding preceding laser welding, to obtain a tailored blank material, each of the coated steel sheets having a Zn—Ni alloy coated layer that contains 10 mass % or more and 25 mass % or less Ni and whose coating weight per side is 10 g/m² or more and 90 g/m² or less; and heating the obtained tailored blank material to a temperature range of an $Ac_3$ transformation point to 1000° C., and then cooling the tailored blank material and hot-pressing the cooled tailored blank material at a temperature of 600° C. or more.

* * * * *